(12) United States Patent
Ljungblad (10) Patent No.: US 9,468,973 B2
(45) Date of Patent: Oct. 18, 2016

(54) METHOD AND APPARATUS FOR ADDITIVE MANUFACTURING

(71) Applicant: Arcam AB, Moelndal (SE)

(72) Inventor: Ulric Ljungblad, Moelndal (SE)

(73) Assignee: ARCAM AB, Moelndal (SE)

(*) Notice: Subject to any disclaimer, the term of this patent is extended or adjusted under 35 U.S.C. 154(b) by 327 days.

(21) Appl. No.: 14/299,887

(22) Filed: Jun. 9, 2014

(65) Prior Publication Data

US 2015/0004045 A1   Jan. 1, 2015

Related U.S. Application Data

(60) Provisional application No. 61/840,936, filed on Jun. 28, 2013.

(51) Int. Cl.
*B22F 3/105* (2006.01)
*B22F 3/10* (2006.01)
*B22F 3/00* (2006.01)

(52) U.S. Cl.
CPC .............. *B22F 3/1035* (2013.01); *B22F 3/003* (2013.01); *B22F 3/1055* (2013.01); *B22F 2003/1057* (2013.01); *Y02P 10/295* (2015.11)

(58) Field of Classification Search
CPC ...... B22F 3/1055; B22F 3/003; B23K 37/00; B05D 3/06; B05C 11/00
See application file for complete search history.

(56) References Cited

U.S. PATENT DOCUMENTS

| | | | |
|---|---|---|---|
| 2,264,968 A | 12/1941 | De Forest | |
| 2,323,715 A | 7/1943 | Kuehni | |
| 3,882,477 A | 5/1975 | Mueller | |
| 4,348,576 A | 9/1982 | Anderl et al. | |
| 4,401,719 A | 8/1983 | Kobayashi et al. | |
| 4,818,562 A | 4/1989 | Arcella et al. | |
| 4,863,538 A | 9/1989 | Deckard | |

(Continued)

FOREIGN PATENT DOCUMENTS

| | | |
|---|---|---|
| CA | 2860188 A1 | 6/2006 |
| CN | 101635210 A | 1/2010 |

(Continued)

OTHER PUBLICATIONS

The International Bureau of WIPO, International Preliminary Report on Patentability for International Application No. PCT/EP2014/062037, Dec. 29, 2015, 8 pages, Switzerland.

(Continued)

*Primary Examiner* — Jessee Roe
*Assistant Examiner* — Christopher Kessler
(74) *Attorney, Agent, or Firm* — Alston & Bird LLP (57) ABSTRACT

A method for forming a three-dimensional article comprising the steps of: applying a model of the three dimensional article, applying a first powder layer on a work table, directing a first electron beam from a first electron beam source over the work table causing the first powder layer to fuse in first selected locations according to the model to form a first cross section of the three-dimensional article, directing a second electron beam from a second electron beam source over the work table, registering at least one setting of the first electron beam source, registering at least one setting of the second electron beam source, correcting the position of the second electron beam depending on the at least one setting of the first electron beam source and the at least one setting of the second electron beam source.

11 Claims, 3 Drawing Sheets

(56) References Cited

U.S. PATENT DOCUMENTS

| | | | |
|---|---|---|---|
| 4,927,992 A | 5/1990 | Whitlow et al. | |
| 4,988,844 A * | 1/1991 | Dietrich | B23K 15/02 219/121.17 |
| 5,167,989 A | 12/1992 | Dudek et al. | |
| 5,182,170 A | 1/1993 | Marcus et al. | |
| 5,247,560 A | 9/1993 | Hosokawa et al. | |
| 5,483,036 A | 1/1996 | Giedt et al. | |
| 5,511,103 A | 4/1996 | Hasegawa | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,419,203 B1 | 7/2002 | Dang | |
| 6,554,600 B1 | 4/2003 | Hofmann et al. | |
| 6,583,379 B1 | 6/2003 | Meiners et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,540,738 B2 | 6/2009 | Larsson et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Montero-Escuder et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 | 9/2015 | Ljungblad | |
| 9,310,188 B2 | 4/2016 | Snis | |
| 2002/0104973 A1 | 8/2002 | Kerekes | |
| 2002/0152002 A1 | 10/2002 | Lindemann et al. | |
| 2003/0133822 A1 | 7/2003 | Harryson | |
| 2004/0084814 A1 | 5/2004 | Boyd et al. | |
| 2004/0104499 A1 | 6/2004 | Keller | |
| 2004/0173496 A1 | 9/2004 | Srinivasan | |
| 2004/0173946 A1 | 9/2004 | Pfeifer et al. | |
| 2005/0173380 A1 | 8/2005 | Carbone | |
| 2005/0186538 A1 | 8/2005 | Uckelmann | |
| 2006/0108712 A1 | 5/2006 | Mattes | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0175875 A1 | 8/2007 | Uckelmann et al. | |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2010/0260410 A1 | 10/2010 | Taminger et al. | |
| 2010/0310404 A1 | 12/2010 | Ackelid | |
| 2011/0133367 A1 | 6/2011 | Weidinger et al. | |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0193530 A1 | 8/2012 | Parker et al. | |
| 2012/0223059 A1 | 9/2012 | Ackelid | |
| 2012/0266815 A1 | 10/2012 | Brunermer | |
| 2013/0055568 A1 | 3/2013 | Dusel et al. | |
| 2013/0300286 A1 | 11/2013 | Ljungblad et al. | |
| 2014/0301884 A1 | 10/2014 | Hellestam et al. | |
| 2014/0308153 A1 | 10/2014 | Ljungblad | |
| 2014/0314609 A1 | 10/2014 | Ljungblad et al. | |
| 2014/0314964 A1 | 10/2014 | Ackelid | |
| 2014/0348691 A1 | 11/2014 | Ljungblad et al. | |
| 2014/0367367 A1 | 12/2014 | Wood et al. | |
| 2015/0071809 A1 | 3/2015 | Nordkvist et al. | |
| 2015/0086409 A1 | 3/2015 | Hellestam | |
| 2015/0088295 A1 | 3/2015 | Hellestam | |
| 2015/0151490 A1 | 6/2015 | Jonasson et al. | |
| 2015/0165524 A1 | 6/2015 | Ljungblad et al. | |
| 2015/0165525 A1 | 6/2015 | Jonasson | |
| 2015/0174658 A1 | 6/2015 | Ljungblad | |
| 2015/0174695 A1 | 6/2015 | Elfstroem et al. | |
| 2015/0251249 A1 | 9/2015 | Fager | |
| 2015/0283610 A1 | 10/2015 | Ljungblad et al. | |
| 2015/0283613 A1 | 10/2015 | Backlund et al. | |
| 2015/0290710 A1 | 10/2015 | Ackelid | |
| 2015/0306819 A1 | 10/2015 | Ljungblad | |
| 2016/0052056 A1 | 2/2016 | Fager | |
| 2016/0052079 A1 | 2/2016 | Ackelid | |
| 2016/0054115 A1 | 2/2016 | Snis | |
| 2016/0054121 A1 | 2/2016 | Snis | |
| 2016/0054347 A1 | 2/2016 | Snis | |
| 2016/0059314 A1 | 3/2016 | Ljungblad et al. | |

FOREIGN PATENT DOCUMENTS

| | | |
|---|---|---|
| CN | 201693176 U | 1/2011 |
| DE | 19952998 A1 | 5/2001 |
| DE | 20305843 U1 | 7/2003 |
| DE | 102005014483 A1 | 10/2006 |
| DE | 202008005417 U1 | 8/2008 |
| DE | 102007018601 A1 | 10/2008 |
| DE | 102008012064 A1 | 9/2009 |
| EP | 0289116 A1 | 11/1988 |
| EP | 0322257 A2 | 6/1989 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| JP | 2003245981 | 9/2003 |
| SE | 524467 C2 | 8/2004 |
| WO | WO 93/08928 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 02/08653 A1 | 1/2002 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |

(56) References Cited

FOREIGN PATENT DOCUMENTS

| WO | WO 2013/167194 A1 | 11/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

Weigel, TH., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

International Searching Authority, International Search Report and Written Opinion for International Application No. PCT/EP2012/074383, mailed Feb. 27, 2013, 10 pages, European Patent Office, The Netherlands.

International Searching Authority, International Search Report for International Application No. PCT/EP2012/057470, mailed Jan. 24, 2013, 1 page, European Patent Office, The Netherlands.

International Searching Authority, International Search Report for International Application No. PCT/EP2012/058733, Mar. 5, 2013, 4 pages, European Patent Office, The Netherlands.

\* cited by examiner

METHOD AND APPARATUS FOR ADDITIVE MANUFACTURING

CROSS-REFERENCE TO RELATED APPLICATIONS

This application claims priority to and the benefit of U.S. Provisional Patent Application Ser. No. 61/840,936, filed Jun. 28, 2013, the contents of which are hereby incorporated by reference in their entirety.

BACKGROUND

1. Technical Field

The present invention relates to a method and apparatus for additive manufacturing of three-dimensional articles.

2. Related Art

Freeform fabrication or additive manufacturing is a method for forming three-dimensional articles through successive fusion of chosen parts of powder layers applied to a worktable via an apparatus.

Such an apparatus may comprise a worktable on which the three-dimensional article is to be formed, a powder dispenser, arranged to lay down a thin layer of powder on the work table for the formation of a powder bed, a ray source for delivering energy to the powder whereby fusion of the powder takes place, elements for control of the ray given off by the ray source over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

There is a demand for additive manufacturing techniques which is capable of building larger and larger three-dimensional articles.

An increase of the build volume may require multiple beam sources which may lead to process difficulties in order to keep the beam spot quality and beam spot positioning equal over the entire build area.

BRIEF SUMMARY

An object of various embodiments of the present invention is to provide a method and apparatus which enables large build volumes of three-dimensional articles produced by freeform fabrication or additive manufacturing without sacrificing the quality of the three dimensional article to be manufactured. The abovementioned object is achieved by the features in the method and the apparatus according to the claims recited herein.

In various embodiments of the invention it is provided a method for forming a three-dimensional article through successive fusion of parts of a powder bed, which parts corresponds to successive cross sections of the three-dimensional article. The method comprising the steps of: applying a model of the three dimensional article, applying a first powder layer on a work table, directing a first electron beam from a first electron beam source over the work table causing the first powder layer to fuse in first selected locations according to the model to form a first part of a first cross section of the three-dimensional article, directing a second electron beam from a second electron beam source over the work table causing the first powder layer to fuse in second selected locations according to the model to form a second part of the first cross section of the three-dimensional article, registering at least one setting of the first electron beam source, registering at least one setting of the second electron beam source, correcting the position of the second electron beam depending on the at least one setting of the first electron beam source and the at least one setting of the second electron beam source for aligning a desired second electron beam position according to the model with a real second electron beam position.

An advantage of various embodiments of the present invention is that the beam position in a multi beam source system in additive manufacturing may be corrected and thereby improving the final result of the three dimensional article.

In another exemplary and non-limiting embodiment the position of the first electron beam is corrected depending on the at least one setting of the second electron beam source and the at least one setting of the first electron beam source for aligning a desired first electron beam position according to the model with a real first electron beam position.

The advantage of this exemplary embodiment is that a plurality of electron beam positions may be adjusted to its correct position simultaneously.

In yet another exemplary and non-limiting embodiment position correcting values may be stored for each combination of the at least one setting in the first and second electron beam source in a look-up table. The advantage of at least this embodiment is that the correction of the wrong electron beam position may be performed quick and easy.

In another exemplary and non-limiting embodiment the position correcting values are experimentally produced or produced by simulation. This means that the position correcting values may be known before the actual correction is to take place, i.e., the correction values may be calculated or simulated before starting the build of the three-dimensional article.

In still another exemplary and non-limiting embodiment the electron beam source settings comprises at least one of the group of: coil current in at least one beam source coil for deflecting and/or shaping the electron beam, and/or the beam power, and/or an electrostatic lens or plate for deflecting and/or shaping the electron beam.

In still another exemplary and non-limiting embodiment of the present invention further comprising the steps of: registering a distance between a first electron beam and a second electron beam, registering an electron beam current of the first and second electron beams, adjusting a position of the first electron beam on the powder layer, where the adjustment is depending on the distance between the first and second electron beams and the beam current of the first and the second beam, adjusting a position of the second electron beam on the powder layer, where the adjustment is depending on the distance between the first and second electron beams and the beam current of the first and the second beam, and/or repeating step at least these steps until the actual position of the first and second electron beam is within a predetermined value from the desired position of the first and second electron beam.

The advantage of this and still other embodiments is that not only the electric and/or the magnetic field from another electron beam source is compensated for but also the distance between two (or more) electron beams as such. Since the electron beams are beams of charged particles they tend to repel each other. When the beams are close to each other the beam position is affected because of the repelling force. By correcting for the misalignment because of this repelling force between two adjacent electron beams, the final result of the three dimensional article may further be improved.

In still another exemplary and non-limiting embodiment the adjustment because of repelling forces between two adjacent electron beams is performed only in case where the distance between the first and second beams are closer to each other than a predetermined value. The advantage of at least this embodiment is that the manufacturing process time may be kept to a minimum because insignificant compensations may be ignored.

Various embodiments of the invention are also related to an apparatus having similar features and advantages as the method.

According to certain embodiments, the apparatus comprises: an electronically produced model of the three dimensional article; a powder distributor configured to provide a first powder layer on a work table; at least one control unit configured to: direct a first electron beam from a first electron beam source over the work table causing the first powder layer to fuse in first selected locations according to the model to form a first part of a first cross section of the three-dimensional article; direct a second electron beam from a second electron beam source over the work table causing the first powder layer to fuse in second selected locations according to the model to form a second part of the first cross section of the three-dimensional article; register at least one setting of the first electron beam source; and register at least one setting of the second electron beam source; and a correcting unit configured to correct the position of the second electron beam depending on the at least one setting of the first electron beam source and the at least one setting of the second electron beam source for aligning a desired second electron beam position according to the model with a real second electron beam position.

In at least one exemplary and non-limiting embodiment, the at least one control unit is further configured to: register a distance between a first electron beam and a second electron beam; register an electron beam current of the first and second electron beams; adjust a position of the first electron beam on the powder layer, where the adjustment is depending on the distance between the first and second electron beams and the beam current of the first and the second beam; and adjust a position of the second electron beam on the powder layer, where the adjustment is depending on the distance between the first and second electron beams and the beam current of the first and the second beam.

In various embodiments, the apparatus comprises: a computer model of the three dimensional article; a powder distributor configured for providing a first powder layer on a work table; a control unit configured to direct a first electron beam from a first electron beam source over the work table causing the first powder layer to fuse in first selected locations according to the model to form a first part of a first cross section of the three-dimensional article; a control unit configured to direct a second electron beam from a second electron beam source over the work table causing the first powder layer to fuse in second selected locations according to the model to form a second part of the first cross section of the three-dimensional article; a control unit configured to register at least one setting of the first electron beam source; a control unit configured to register at least one setting of the second electron beam source; and a correcting unit configured to correcting the position of the second electron beam depending on the at least one setting of the first electron beam source and the at least one setting of the second electron beam source for aligning a desired second electron beam position according to the model with a real second electron beam position.

In certain of these embodiments, the control unit which is configured to direct the first electron beam and the control unit which is configured to direct the second electron beam are the same unit.

In other embodiments the control unit which is configured to register the at least one setting of the first electron beam source and the control unit which is configured to direct the first electron beam are the same unit; and/or the control unit which is configured to register the at least one setting of the second electron beam source and the control unit which is configured to direct the second electron beam are the same unit.

BRIEF DESCRIPTION OF THE SEVERAL VIEWS OF THE DRAWING(S)

The invention will be further described in the following, in a non-limiting way with reference to the accompanying drawings. Same characters of reference are employed to indicate corresponding similar parts throughout the several figures of the drawings.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The source of a charged particle beam can include an electron source, a linear accelerator and so on.

Figure 1:
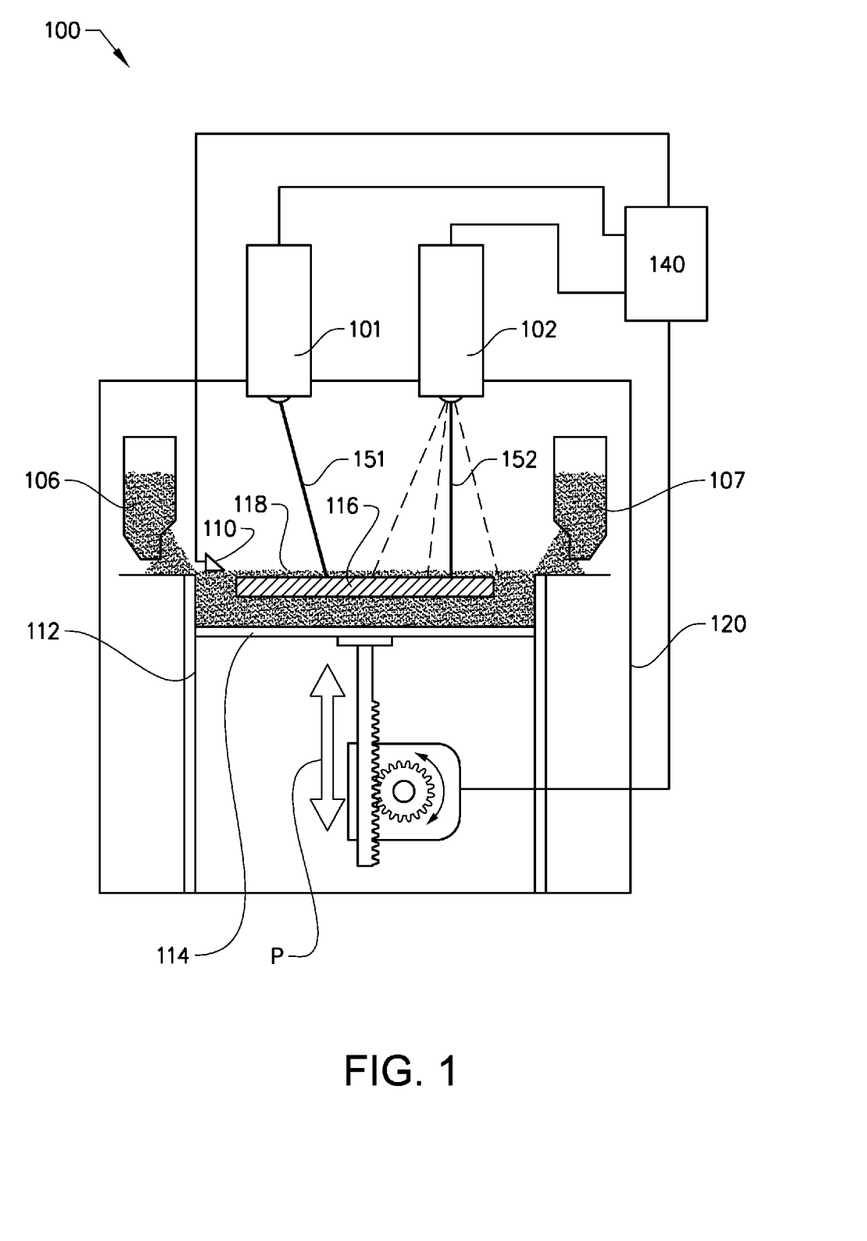
FIG. 1 depicts a side view of an additive manufacturing apparatus according to various embodiments of the present invention.

FIG. 1 depicts an embodiment of a freeform fabrication or additive manufacturing apparatus 100 according to various embodiments of the present invention. The apparatus 100 comprises two electron beam sources 101, 102; two powder hoppers 106, 107; a start plate 116; a build tank 112; a powder distributor 110; a build platform 114; a vacuum chamber 120 and a control unit 140. FIG. 1 discloses only two electron beam sources for sake of simplicity. Of course, any number of electron beam sources may be used in a similar manner as the two electron beam sources which are used for describing the invention. It is obvious for the skilled person when having seen the inventive concept as disclosed herein using only two electron beam sources and apply them for any specific number that might suit his or her purpose.

The vacuum chamber 120 is capable of maintaining a vacuum environment by means of a vacuum system, which system may comprise a turbo molecular pump, a scroll pump, an ion pump and one or more valves which are well known to a skilled person in the art and therefore need no further explanation in this context. The vacuum system may be controlled by the control unit 140.

The electron beam sources 101, 102 are generating electron beams, which are used for melting or fusing together powder material 118 provided on the start plate 116. At least a portion of the electron beam sources 101, 102 may be provided in the vacuum chamber 120. The control unit 140 may be used for controlling and managing the electron beams emitted from the electron beam sources 101, 102. A first electron beam source 101 may be emitting a first electron beam 151 and a second electron beam source 102 may be emitting a second electron beam 152. The first electron beam 151 may be deflected between at least a first extreme position and at least a second extreme position. The second electron beam 152 may be deflected between at least a first extreme position and at least a second extreme position. At least one of the first or second extreme positions of the first electron beam 151 may be overlapping one of the at least first or second extreme positions of the second electron beam 152 and thereby creating an overlapping region.

At least one electron beam focusing coil (not shown), at least one electron beam deflection coil (not shown) and an electron beam power supply (not shown) may be electrically connected to the control unit 140. In an exemplary and non-limiting embodiment of the invention the first and second electron beam sources 101, 102 may generate a focusable electron beam with an accelerating voltage of about 60 kV and with a beam power in the range of 0-6 kW. The pressure in the vacuum chamber may be in the range of $10^{-3}$-$10^{-6}$ mBar when building the three-dimensional article by fusing the powder layer by layer with the electron beam sources 101, 102.

The powder hoppers 106, 107 comprise the powder material to be provided on the start plate 116 in the build tank 112. The powder material may for instance be pure metals or metal alloys such as titanium, titanium alloys, aluminum, aluminum alloys, stainless steel, Co—Cr—W alloy, superalloys, etc.

The powder distributor 110 may be arranged to lay down a thin layer of the powder material on the start plate 116. During a work cycle the build platform 114 will be lowered successively in relation to the electron beam source after each added layer of powder material. In order to make this movement possible, the build platform 114 is in one embodiment of the invention arranged movably in vertical direction, i.e., in the direction indicated by arrow P. This means that the build platform 114 starts in an initial position, in which a first powder material layer of necessary thickness has been laid down on the start plate 116. A first layer of powder material may be thicker than the other applied layers. A reason for starting with a first layer which is thicker than the other layers may be that one does not want a melt-through of the first layer onto the start plate. The build platform may thereafter be lowered in connection with laying down a new powder material layer for the formation of a new cross section of a three-dimensional article. Means for lowering the build platform 114 may for instance be through a servo engine equipped with a gear, adjusting screws and the like.

In a first exemplary and non-limiting embodiment of a method according to the present invention a three-dimensional article may be formed through successive fusion of parts of a powder bed, which parts corresponds to successive cross sections of the three-dimensional article.

In a first step a model of the three dimensional article is provided. The model may for instance be provided by a computer program, for instance computer aided design (CAD) program. In the model of the three dimensional article, the three dimensional article may be sliced in layers with a predetermined thickness.

In a second step a first powder layer may be applied on the start plate 116. The powder may be taken from the powder hopper 106, 107 and be distributed evenly by the powder distributor 110. The thickness of the layer may be determined by the distance from the top surface of the start plate 116 or the top surface of the previous layer on the start plate 116 to the lowest position of the powder distributor 110. The thickness of the powder layer may correspond to the thickness of the slice in the model of the three dimensional article.

In a third step a first electron beam may be directed from a first electron beam source over the first powder layer causing the first powder layer to fuse in first selected locations according to the model to form a first part of a first cross section of the three-dimensional article. The first electron beam may only reach a first area of the powder layer.

In a fourth step a second electron beam may be directed from a second electron beam source over the first powder layer causing the first powder layer to fuse in second selected locations according to the model to form a second part of the first cross section of the three-dimensional article. The second electron beam may only reach a second area of the powder layer which may partially overlap the first area of the powder area, which first area may be reached by the first electron beam.

Figure 4:
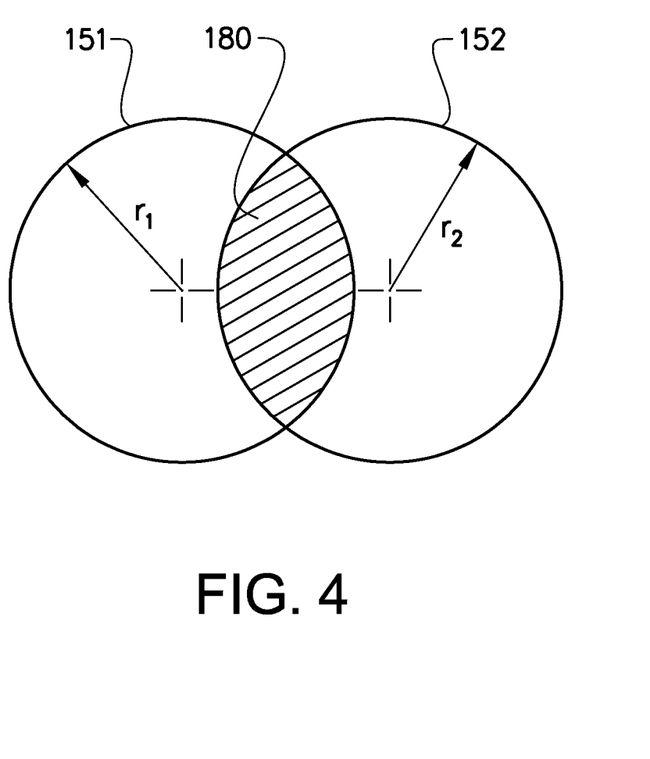
FIG. 4 depicts a top view of two partially overlapping electron beam covering areas according to various embodiments of the present invention.

FIG. 4 depicts an exemplary and non-limiting embodiment of a first electron beam reaching a first area and a second electron beam reaching a second area, which first and second areas are partially overlapping each other. The first electron beam 151 is reaching a first area having a radius r1 and the second electron beam 152 is reaching a second area having a radius r2. The radius r1 and r2 denotes the maximum deflection of the first end second electron beam respectively, which means that any position within the first area may be reached by the first electron beam 151 and any position within the second area may be reached by the second electron beam. The first and second areas are overlapping each other in an overlapping region 180 which may be reached by the first and second electron beams 151, 152. I first area may be different to the second area, i.e., the first radius r1 may be different to the second radius r2.

In a fifth step at least one setting of the first electron beam source may be registered. The setting which may be registered may be the coil current in at least one beam source coil for deflecting and/or shaping the first electron beam. The first electron beam source may use at least one deflection coil for deflecting the electron beam. The deflection of the electron beam is depending on the current in the deflection coil. A large current will deflect the electron beam more than a small current. The beam power of the first electron beam may also be registered, alone or in combination with one or more other settings of the first electron beam source. A setting of an electrostatic lens or plate for deflecting and/or shaping the electron beam may also be registered alone or in combination with one or more other settings of the first electron beam source.

In a sixth step at least one setting of the second electron beam source may be registered. The setting which may be registered may be the coil current in at least one beam source coil for deflecting and/or shaping the second electron beam. The second electron beam source may use at least one deflection coil for deflecting the electron beam. The deflection of the electron beam is depending on the current in the deflection coil. A large current will deflect the electron beam more than a small current. The beam power of the second electron beam may also be registered, alone or in combination with one or more other settings of the second electron beam source. A setting of an electrostatic lens or plate for deflecting and/or shaping the second electron beam may also be registered alone or in combination with one or more other settings of the second electron beam source.

In a seventh step the position of the second electron beam may be corrected depending on the at least one setting of the first electron beam source and the at least one setting of the second electron beam source for aligning a desired second electron beam position according to the model with a real second electron beam position.

Figure 2:
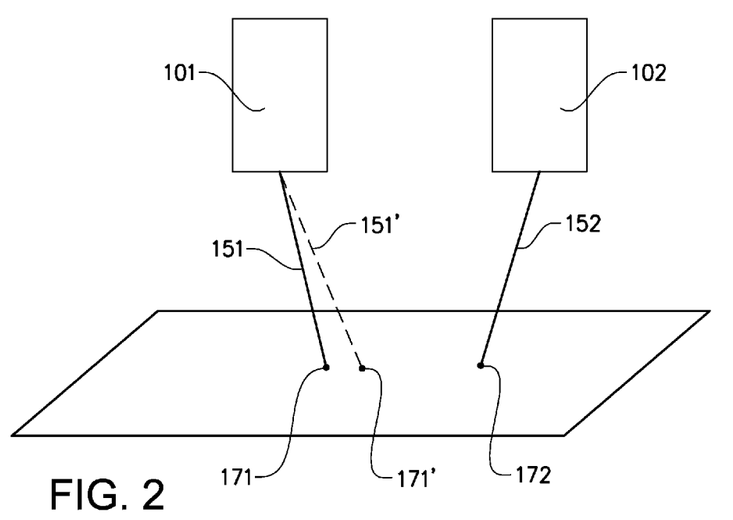
FIG. 2 depicts a first schematic perspective view of two electron beam sources and a work table according to various embodiments of the present invention.

FIG. 2 illustrates schematically what may happen to a first electron beam 151 from a first electron beam source 101 when a second electron beam source 102 is provided in the vicinity of the first electron beam source 101. The real first electron beam 151 from the first electron beam source 101 is creating a real beam spot 171 on the powder surface. However, the real beam spot 171 is misplaced in relation to a desired beam spot position 171' due to the fact that the real first beam 151 is deflected from the desired beam 151' position. The misplacement is due to the electron beam source settings in the second electron beam source 102. Without the second electron beam source 102 or with zero beam current to the second electron beam source 102 and zero coil currents to the beam shaping optics the real beam position and the desired beam position would be the same. When the second electron beam source 102 is turned on, the settings in the second electron beam source 102 will affect the positioning of the first electron beam 151 from the first electron beam source 101.

Figure 3:
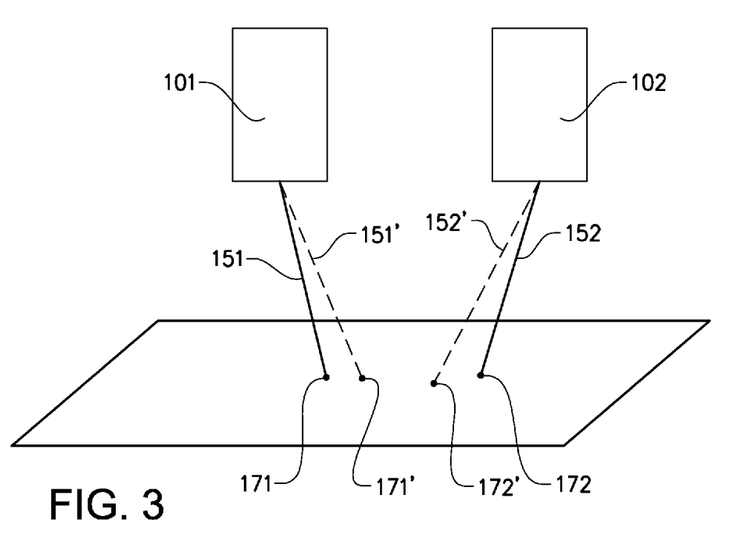
FIG. 3 depicts a second schematic perspective view of two electron beam sources and a work table according to various embodiments of the present invention.

FIG. 3 illustrates schematically what may happen in addition to what is disclosed in relation to FIG. 2 namely that the first electron beam source may also affect the second electron beam and vice versa. When the first and second electron beam sources 101, 102 are working simultaneously the first electron beam source 101 may affect the deflection and/or spot size and/or spot shape of the second electron beam 152 and the second electron beam source 102 may affect the deflection and/or spot size and/or spot shape of the first electron beam 151.

In order to determine the deviation between an actual and desired spot position on the powder layer or start plate there are several possible alternatives.

Firstly the deviation can be determined experimentally.

First one may have to determine the unaffected position of the beam spot on the start plate. This may most easily be made by letting one electron beam source at a time be operated, i.e., switching off all electron beam sources except the one to determine the non-affected beam positioning of. A number of beam position values may be determined for this sole working electron beam source by measurement, and the values which are really not measured, i.e., values in between measuring positions, may be acquired by a mathematical function or model using the measured positions.

Then, the first electron beam may have its internal components such as deflection coil(s) or plate(s), astigmatism coil(s) and/or focusing coils(s) and beam power value set to a first set of predetermined values. The second electron beam may be set to a predetermined number of different settings of its deflection coil(s) or plate(s), astigmatism coil(s) and/or focusing coils(s) and beam power value and the actual positions of the second electron beam are determined for the different predetermined settings. The actual positions are then compared to the desired positions which may be the measured unaffected beam positioning for the same settings of the second electron beam source. The deviation between desired beam positioning and the actual beam positioning may then be the correction value but with an opposite sign of its vector. This procedure is remade for a predetermined number of sets of predetermined values of the first electron beam. The same method may be applied to determine all correction values for all electron beam sources. The correction values may be stored in a look-up table for easy and fast access.

Instead of determining the deviation experimentally the deviation may be simulated by using simulated magnetic and/or electric fields from the electron beam sources. Since the specification of the coils or plates which are used in the electron beam source for beam shaping and/or beam deflection together with the beam power is known it may be possible to simulate a deviation of a particular electron beam because of the influence of the magnetic fields of surrounding electron beam sources.

Instead of simulating the magnetic fields from surrounding electron beam sources the magnetic field may be detected. The magnetic field may be detected at and/or around the different electron beams and the detected magnetic field may be used in a simulation for producing the actual correction values. The correction values may be stored in a look-up table.

In another exemplary and non-limiting embodiment not only the second electron beam is corrected but also the position of the first electron beam may be corrected depending on the at least one setting of the second electron beam source and the at least one setting of the first electron beam source for aligning a desired first electron beam position according to the model with a real first electron beam position.

In a setup with more than two (2) electron beam sources the correction may be done for a predetermined number of electron beams which may be just one, two or all of them.

In still another exemplary and non-limiting embodiment of the present invention a distance may be registering between a first electron beam and a second electron beam.

An electron beam current of the first and second electron beams may also be registered. A position of the first electron beam may be adjusted on the powder layer, where the adjustment is depending on the distance between the first and second electron beams and the beam current of the first and the second beam. A position of the second electron beam may be adjusted on the powder layer, where the adjustment is depending on the distance between the first and second electron beams and the beam current of the first and the second beam. An electron beam which is within a predetermined distance from another electron beam may repel each other due to the electrostatic force of the electrons in the electron beams. The repelling force is a force which decline with 1/d3 where d is the distance between the beams. If d is big the effect of the repelling force is relatively small, however, two beams which are relatively close to each other may affect each ones position apparently. This embodiment registers the deviation from desired and actual beam position due to electrostatic repelling forces between at least two adjacent beams and compensate for it.

In another aspect of the present invention it is provided an apparatus for forming a three-dimensional article through successive fusion of parts of a powder bed, which parts corresponds to successive cross sections of the three-dimensional article. The apparatus comprising a computer model of the three dimensional article. The computer model may be a Computer Aided Design (CAD) model.

A powder distributor may be used for providing a first powder layer on a work table. The powder distributor may provide a predetermined thickness of the powder layer by adjusting the bottom surface of the powder distributor to the previous layer. The adjustment may be performed by lowering the previous applied and fused layer and/or adjusting the distance to the previous layer with the powder distributor itself.

A control unit for directing a first electron beam from a first electron beam source over the work table causing the first powder layer to fuse in first selected locations according to the model to form a first part of a first cross section of the three-dimensional article. The control unit may store the computer model which is to be fabricated and also a fusing and/or heating pattern for the multiple beams which is used for melting and heating the powder layers for forming the three-dimensional article. A control unit for directing a second electron beam from a second electron beam source over the work table causing the first powder layer to fuse in second selected locations according to the model to form a second part of the first cross section of the three-dimensional article. The control unit for directing the second beam may be the same as the control unit for directing the first electron beam or a separate unit communicating with the other control unit for the first electron beam.

A control unit for registering at least one setting of the first electron beam source. At least one of the beam power or the deflection of the first electron beam may be registered in order to have a reference point for the forthcoming correction for the second electron beam.

A control unit for registering at least one setting of the second electron beam source. At least the deflection or the beam powder of the second electron beam is registered for controlling how the correction should be made to the second electron beam.

A correcting unit for correcting the position of the second electron beam depending on the at least one setting of the first electron beam source and the at least one setting of the second electron beam source for aligning a desired second electron beam position according to the model with a real second electron beam position. The correction may depend on the setting in the in at least one beam source coil for deflecting and/or shaping the electron beam, and/or an electrostatic lens or plate for deflecting and/or shaping the electron beam and/or the beam power. The correction unit may move the actual second electron beam position to the desired second electron beam position by adjusting the current through the beam source coil for deflecting the second electron beam. The correction unit may comprise a look-up table with beam source coil settings for deflecting the electron beam a predetermined distance in a predetermined direction. Alternatively the correcting unit may calculate the beam source coil settings for deflecting the electron beam a predetermined distance in a predetermined direction in real time.

A storing unit may be used for storing position correcting values for each combination of the at least one setting in the first and second electron beam source. The storing unit may comprise a look-up table.

In another exemplary and non-limiting embodiment of the present invention the apparatus further comprises a control unit for registering a distance between a first electron beam and a second electron beam. The distance is the actual distance between the electron beams on the powder bed or the start plate where they are intended to impinge.

The apparatus may further comprise a control unit for registering an electron beam current of the first and second electron beams. In addition to the registration of the distance between the first and second electron beams the electron beam current may also be detected since it may influence the actual correction value.

In a control unit a position of the first electron beam on the powder layer may be adjusted, where the adjustment is depending on the distance between the first and second electron beams and the beam current of the first and the second beam. Electron beams which are close to each other may repel each other due to its charged particles. The degree of repelling is depending on the distance between the electron beams and the electron beam current, i.e., the number of electron beams/time unit in each electron beam. When knowing the distance between the electron beams and its power a control unit may be used for adjusting a position of the second electron beam on the powder layer, where the adjustment is depending on the distance between the first and second electron beams and the beam current of the first and the second beam.

A control unit may be adapted to repeat the registering and adjusting until the actual position of the first and second electron beam is within a predetermined value from the desired position of the first and second electron beam.

In an exemplary and non-limiting embodiment of the present invention the correcting unit may be the same unit as the control unit.

In an exemplary and non-limiting embodiment of a method for forming a three-dimensional article through successive fusion of parts of a powder bed, which parts corresponds to successive cross sections of the three-dimensional article, comprising providing a first powder layer on the start plate 116. The powder may be distributed evenly over the worktable according to several methods. One way to distribute the powder is to collect material fallen down from the hopper 106, 107 by a rake system. The rake is moved over the build tank thereby distributing the powder over the start plate. The distance between a lower part of the rake and the upper part of the start plate or previous powder layer determines the thickness of powder distributed over the start plate. The powder layer thickness can easily be adjusted by adjusting the height of the build platform 114.

A first energy beam may be directed from a first energy beam source over the work table causing the first powder layer to fuse in the first selected locations according to the model to form a first part of a first cross section of the three-dimensional article. A first energy beam 151 may reach a predetermined area which is dependent on the maximum deflection angle and the distance from the electron beam source 101 to the work table. For this reason the first energy beam 151 may only reach a portion of the total build area, i.e., a portion of a first cross section of the three-dimensional article 130.

The electron beam may be directed over the start plate 116 from instructions given by a control unit 140. In the control unit 140 instructions for how to control the beam source 101, 102 for each layer of the three-dimensional article may be stored.

A second energy beam 152 may be directed from a second energy beam source 102 over the work table causing the first powder layer to fuse in second selected locations 2 according to the model to form a second part of the first cross section of the three-dimensional article 130.

As with the first energy beam 151, the second energy beam 152 may also reach a predetermined area which is dependent on the maximum deflection angle and the distance from the energy beam source to the work table.

For this reason the second energy beam 152 may only reach a portion of the total build area, i.e., a portion of a first cross section of the three-dimensional article 130.

In an exemplary and non-limiting embodiment of the present invention the first and second locations of the first powder layer which are at least partially overlapping each other in the overlapping region may be simultaneously fused by the first and second energy beam 151, 152 from the first and second energy beam source 101, 102 respectively.

Simultaneous fusing by the first and second beam 151, 152 in the overlapping region may be performed in different ways.

A first way is to fuse or heat the powder with the first beam 151 at a first passage in the region 3 simultaneously as the second beam 152 may be fusing or heating the powder at a second passage, which is separated from the first passage. A first passage fused by the first beam may be refused by the second beam after the first beam has left the passage, i.e., the first and second beams are not simultaneously at the very same position at any time.

A second way is to fuse or heat the powder with the first and the second beam so that the first and second beams 151, 152 are at least once in the very same position simultaneously.

After a first layer is finished, i.e., the fusion of powder material for making a first layer of the three-dimensional article, a second powder layer is provided on the work table 116. In one embodiment, the second powder layer is distributed according to the same manner as the previous layer. However, there might be alternative methods in the same additive manufacturing machine for distributing powder onto the work table. For instance, a first layer may be provided by means of a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 106 and a right powder hopper 107, the rake as such can change design.

After having distributed the second powder layer on the work table 116, the first energy beam 151 from the first energy beam source 101 may be directed over the work table 116 causing the second powder layer to fuse in a third selected locations according to the model to form a second cross section of the three-dimensional article.

Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

In another exemplary and non-limiting embodiment of a method for forming a three-dimensional article through successive fusion of parts of a powder bed, which parts corresponds to successive cross sections of the three-dimensional article, the method comprising the steps of providing a model of the three dimensional article, providing a first powder layer on a work table, directing a first electron beam from a first electron beam source over the work table causing the first powder layer to fuse in first selected locations according to the model to form a first portion of a first cross section of the three-dimensional article, detecting a first external magnetic and/or electric field around the first electron beam source, correcting the position of the first electron beam depending on the external magnetic and/or electric field around the first electron beam source for aligning a desired first electron beam position according to the model with a real first electron beam position.

In an exemplary and non-limiting embodiment the external magnetic and/or electric filed originates from at least a second electron beam source aimed for fusing the first powder layer in second selected locations according to the model to form a second portion of the first cross section of the three-dimensional article.

In still another exemplary and non-limiting embodiment the external magnetic and/or electric field around the first electron beam source is calculated by using the electric and/or magnetic fields from the at least one second electron beam source.

In still another exemplary and non-limiting embodiment the calculation is taking into account instantaneous electron beam source settings of the at least one second electron beam source.

The invention is not limited to the above-described embodiments and many modifications are possible within the scope of the following claims. Such modifications may, for example, involve using a different source of ray source than the exemplified electron beam such as laser beam. Other materials than metallic powder may be used, such as powders of polymers and/or powder of ceramics.

It will be appreciated that many variations of the above systems and methods are possible, and that deviation from the above embodiments are possible, but yet within the scope of the claims. Many modifications and other embodiments of the invention set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for forming a three-dimensional article through successive fusion of parts of a powder bed, which parts corresponds to successive cross sections of the three-dimensional article, the apparatus comprising:
   an electronically produced model of the three dimensional article;
   a powder distributor configured to provide a first powder layer on a work table;
   at least one control unit configured to:
      direct a first electron beam from a first electron beam source over the work table causing the first powder layer to fuse in first selected locations according to the model to form a first part of a first cross section of the three-dimensional article;
      direct a second electron beam from a second electron beam source over the work table causing the first powder layer to fuse in second selected locations according to the model to form a second part of the first cross section of the three-dimensional article;
      register at least one setting of the first electron beam source; and
      register at least one setting of the second electron beam source; and
   a correcting unit configured to correct the position of the second electron beam depending on the at least one setting of the first electron beam source and the at least one setting of the second electron beam source for aligning a desired second electron beam position according to the model with a real second electron beam position.

2. The apparatus according to claim 1, wherein the at least one control unit comprises at least a first control unit and a second control unit, the first control unit being configured to direct the first electron beam and the second control unit being configured to direct the second electron beam.

3. The apparatus according to claim 2, wherein the electron beam source settings comprises at least one of: a coil current in at least one beam source coil for at least one of deflecting or shaping at least one of the electron beam or the beam power, an electrostatic lens for at least one of deflecting or shaping the electron beam, or an electrostatic plate for at least one of deflecting or shaping the electron beam.

4. The apparatus according to claim 1, further comprising a storing unit for storing position correcting values for each combination of the at least one setting in the first and second electron beam source.

5. The apparatus according to claim 1, wherein the at least one control unit is further configured to:
   register a distance between a first electron beam and a second electron beam;
   register an electron beam current of the first and second electron beams;
   adjust a position of the first electron beam on the powder layer, where the adjustment is depending on the distance between the first and second electron beams and the beam current of the first and the second beam; and
   adjust a position of the second electron beam on the powder layer, where the adjustment is depending on the distance between the first and second electron beams and the beam current of the first and the second beam.

6. The apparatus according to claim 5, wherein the steps of claim 5 are repeated until the actual position of the first and second electron beam is within a predetermined value from the desired position of the first and second electron beam.

7. An apparatus for forming a three-dimensional article through successive fusion of parts of a powder bed, which parts corresponds to successive cross sections of the three-dimensional article, the apparatus comprising:
   a computer model of the three dimensional article;
   a powder distributor configured for providing a first powder layer on a work table;
   a control unit configured to direct a first electron beam from a first electron beam source over the work table causing the first powder layer to fuse in first selected locations according to the model to form a first part of a first cross section of the three-dimensional article;
   a control unit configured to direct a second electron beam from a second electron beam source over the work table causing the first powder layer to fuse in second selected locations according to the model to form a second part of the first cross section of the three-dimensional article;
   a control unit configured to register at least one setting of the first electron beam source;
   a control unit configured to register at least one setting of the second electron beam source; and
   a correcting unit configured to correcting the position of the second electron beam depending on the at least one setting of the first electron beam source and the at least one setting of the second electron beam source for aligning a desired second electron beam position according to the model with a real second electron beam position.

8. The apparatus according to claim 7, wherein the control unit which is configured to direct the first electron beam and the control unit which is configured to direct the second electron beam are the same unit.

9. The apparatus according to claim 7, wherein:
   the control unit which is configured to register the at least one setting of the first electron beam source and the control unit which is configured to direct the first electron beam are the same unit; and
   the control unit which is configured to register the at least one setting of the second electron beam source and the control unit which is configured to direct the second electron beam are the same unit.

10. The apparatus according to claim 7, further comprising:
   a control unit configured to register a distance between a first electron beam and a second electron beam;
   a control unit configured to register an electron beam current of the first and second electron beams;
   a control unit configured to adjust a position of the first electron beam on the powder layer, where the adjustment is depending on the distance between the first and second electron beams and the beam current of the first and the second beam; and
   at least one control unit configured to adjust a position of the second electron beam on the powder layer, where the adjustment is depending on the distance between the first and second electron beams and the beam current of the first and the second beam.

11. The apparatus according to claim 10, wherein the at least one control unit is configured to repeat the steps of claim 10 until the actual position of the first and second electron beam is within a predetermined value from the desired position of the first and second electron beam.

* * * * *